United States Patent
Yan et al.

(10) Patent No.: US 9,318,240 B2
(45) Date of Patent: Apr. 19, 2016

(54) HALOGEN-FREE, FLAME RETARDANT COMPOSITION COMPRISING CROSSLINKED SILANE-G-EVA

(75) Inventors: Wilson Xiao Wei Yan, Suzhou (CN); Given Jing Chen, Shanghai (CN); Lotus Hua Huang, Shanghai (CN); David Hong Fei Guo, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 34 days.

(21) Appl. No.: 13/695,862

(22) PCT Filed: May 24, 2010

(86) PCT No.: PCT/CN2010/073106
§ 371 (c)(1),
(2), (4) Date: Nov. 2, 2012

(87) PCT Pub. No.: WO2011/147068
PCT Pub. Date: Dec. 1, 2011

(65) Prior Publication Data
US 2013/0059943 A1    Mar. 7, 2013

(51) Int. Cl.
| C09K 21/14 | (2006.01) |
| B32B 27/38 | (2006.01) |
| H01B 7/295 | (2006.01) |
| C08L 75/06 | (2006.01) |
| C09K 21/12 | (2006.01) |

(52) U.S. Cl.
CPC .............. *H01B 7/295* (2013.01); *C08L 75/06* (2013.01); *C09K 21/12* (2013.01)

(58) Field of Classification Search
None
See application file for complete search history.

(56) References Cited

U.S. PATENT DOCUMENTS

| 4,144,202 A | 3/1979 | Ashcraft et al. |
| 4,385,133 A | 5/1983 | Alberino et al. |
| 4,522,975 A | 6/1985 | O'Connor et al. |
| 4,542,170 A | 9/1985 | Hall et al. |
| 4,690,964 A * | 9/1987 | Schmidt et al. ............... 524/125 |
| 5,167,899 A | 12/1992 | Jezic |
| 5,225,469 A | 7/1993 | Maringer et al. |
| 5,246,783 A | 9/1993 | Spenadel et al. |
| 5,266,627 A | 11/1993 | Meverden et al. |

(Continued)

FOREIGN PATENT DOCUMENTS

| CN | 101174491 | 5/2008 |
| CN | 101313030 | 11/2008 |

(Continued)

OTHER PUBLICATIONS

Royal Society of Chemistry, Learn Chemistry—Substance: Aluminum hydroxide (RSC). Aug. 31, 2011. http://www.rsc.org/learn-chemistry/wiki/Substance:Aluminium_hydroxide.*

(Continued)

*Primary Examiner* — Coris Fung
(74) *Attorney, Agent, or Firm* — Whyte Hirschboeck Dudek S.C.

(57) ABSTRACT

Halogen-free, flame retardant compositions comprising in weight percent based on the weight of the composition: A. 20 to 60% TPU/Si-g-EVA polymer blend in which the Si-g-EVA is crosslinked, B. 1 to 25% organic phosphate ester, C. 30 to 60% metal hydrate, and D. 0.1 to 10% epoxidized novolac. Optionally, the compositions further comprise in weight percent based on the weight of the composition, one or more of: E. 0.01 to 0.5% anti-dripping agent, F. 0.1 to 2% additive; and G. 0.1 to 5% filler.

10 Claims, 1 Drawing Sheet

(56) References Cited

U.S. PATENT DOCUMENTS

| | | | |
|---|---|---|---|
| 6,365,071 | B1 | 4/2002 | Jenewein et al. |
| 6,455,637 | B1 | 9/2002 | Jackson et al. |
| 6,496,629 | B2 | 12/2002 | Ma et al. |
| 6,547,992 | B1 | 4/2003 | Schlosser et al. |
| 6,714,707 | B2 | 3/2004 | Rossi et al. |
| 2002/0072554 | A1* | 6/2002 | Mehl .......................... 524/136 |
| 2002/0151647 | A1 | 10/2002 | Laughner et al. |
| 2003/0065091 | A1* | 4/2003 | Brann et al. .................... 525/64 |
| 2003/0166749 | A1 | 9/2003 | Eckstein et al. |
| 2003/0232933 | A1* | 12/2003 | Lagneaux et al. ............ 525/452 |
| 2006/0211819 | A1* | 9/2006 | Hoenig et al. .................. 525/88 |
| 2007/0015425 | A1* | 1/2007 | Hill et al. ........................ 442/76 |
| 2008/0132615 | A1 | 6/2008 | Peerlings et al. |
| 2008/0167408 | A1 | 7/2008 | Siddhamalli et al. |
| 2009/0020311 | A1 | 1/2009 | Park et al. |
| 2009/0255707 | A1* | 10/2009 | Moriuchi et al. ....... 174/110 SR |
| 2011/0130491 | A1 | 6/2011 | Fukushima et al. |
| 2011/0190407 | A1* | 8/2011 | Balbo Block et al. ........ 521/108 |

FOREIGN PATENT DOCUMENTS

| | | | |
|---|---|---|---|
| CN | 101624469 | | 1/2010 |
| DE | 4018716 | | 12/1991 |
| EP | 0287928 | | 10/1988 |
| EP | 0722612 | | 4/1995 |
| EP | 1241222 | | 9/2002 |
| EP | 1422262 | | 5/2004 |
| EP | 1512718 | | 3/2005 |
| EP | 1953193 | A1 | 8/2008 |
| JP | 2009-114230 | * | 5/2008 |
| JP | 2008-122803 | * | 5/2009 |
| JP | 2009263597 | | 11/2009 |
| TW | 200938579 | | 9/2009 |
| WO | 9961526 | | 12/1999 |
| WO | WO2007058349 | * | 5/2007 |
| WO | 2008/120854 | A1 | 10/2008 |
| WO | 2009/100232 | A1 | 8/2009 |
| WO | 2010013400 | | 2/2010 |

OTHER PUBLICATIONS

API, Glossary of Plastic Injection Molding Terms. Retrieved on Nov. 26, 2014. http://www.apisolution.com/downloads/glossary_plastic_injection_molding_engineering_manufacturing.pdf.*

Dow Corning® 4-7081 Resin Modifier. Retrieved on Mar. 12, 2015. http://www.dowcorning.com/applications/search/products/details.aspx?prod=02380803&type=PROD.*

Kuwazaki et al., JP 2008-122803 machine translation, May 29, 2008.*

Nishiguchi et al., JP 2009-114230 machine translation, May 28, 2009.*

International Preliminary Report on Patentability for PCT. App. No. PCT/CN2010/073106 mailed Mar. 3, 2011.

Translation of Chuan-Mei Jiao, "Study of Silane Crosslinking and Halogen-Free Flame Retardation of Ethylene-Vinyl Acetate Copolymers", Chemical Engineering & Equipment, 2007, vol. 6, p. 1-6, Dec. 31, 2007.

* cited by examiner

HALOGEN-FREE, FLAME RETARDANT COMPOSITION COMPRISING CROSSLINKED SILANE-G-EVA

BACKGROUND OF THE INVENTION

1. Field of the Invention

The invention relates to thermoplastic polyurethane (TPU) composites. In one aspect the invention relates to TPU composites that are halogen-free and flame retardant while in another aspect, the invention relates to TPU composites that are halogen-free, flame retardant and comprise crosslinked, silane grafted ethylene vinyl acetate copolymer.

2. Description of the Related Art

Halogen-free, flame retardant (HFFR) thermoplastic polyurethane (TPU) compositions are replacing halogen-containing, flame retardant TPU compositions in a number of applications including, but not limited to, the insulation and protective jackets for the wire and cable associated with personal electronic devices. These HFFR TPU compositions can provide excellent flame retardant performance and mechanical properties including excellent flexibility. Moreover, these HFFR TPU compositions can fulfill the heat deformation testing (UL-1581) requirements at 150° C. which is particularly important for some applications and generally is not obtainable with a polymer matrix of uncrosslinked polyolefin. However, these HFFR TPU compositions are not without their limitations and in comparison with HFFR polyolefin compositions, often prove more costly and exhibit insulation resistance (IR) failure, poor smoke density and higher material density.

Ethylene vinyl acetate (EVA) copolymer has a good compatibility with TPU and also exhibits good flexibility. EVA with a low vinyl acetate content (30 weight percent (wt %) or less) displays higher electrical resistance and lower material density than TPU. EVA is also less expensive than TPU, and it does not contain a benzene structure in its molecular structure (aromatics structures contribute to the smoke density of a product). As such, EVA appears at first as an appropriate compound for blending with TPU so as to improve on the IR and smoke density properties of TPU without sacrifice of the mechanical property and flexibility of TPU. However, the heat deformation performance of TPU is destroyed upon its compounding with EVA and as such, HFFR TPU/EVA compositions cannot pass heat deformation specifications that require a deformation ratio lower than 50% at 150° C.

SUMMARY OF THE INVENTION

In one embodiment the invention is a halogen-free, flame retardant composition comprising a thermoplastic polyurethane (TPU) and a silane-grafted, crosslinked ethylene vinyl acetate (Si-g-EVA) copolymer. In one embodiment the HFFR TPU/Si-g-EVA composition further comprises at least one organic phosphate ester and/or at least one metal hydrate and a char forming agent, e.g., an epoxidized novolac resin. In one embodiment, the HFFR TPU/Si-g-EVA composition further comprises one or more additives or fillers such as an anti-drip agent, an antioxidant, a UV-stabilizer, processing aids and/or a metal oxide such as titanium dioxide.

In one embodiment the invention is a HFFR TPU/Si-g-EVA composition comprising in weight percent based on the weight of the composition:
 A. 20 to 60% TPU/Si-g-EVA polymer blend in which the Si-g-EVA is crosslinked,
 B. 5 to 20% organic phosphate ester,
 C. 30 to 60% metal hydrate, and
 D. 0.1 to 10% char forming agent.

In one embodiment the TPU/Si-g-EVA polymer blend comprises 50 to 95 wt % TPU and 5 to 50 wt % Si-g-EVA based on the weight of the blend, i.e., TPU plus Si-g-EVA. In one embodiment the vinyl acetate content of the EVA is 10 to 70 wt % of the copolymer. In one embodiment the silane content of the Si-g-EVA is 0.5 to 5 wt % based on the weight of the EVA copolymer. In one embodiment the Si-g-EVA is crosslinked in the presence of the TPU and under ambient conditions.

In one embodiment the HFFR TPU/Si-g-EVA composition further comprises in weight percent based on the weight of the composition, one or more of:
 E. 0.01 to 0.5% anti-dripping agent,
 F. 0.1 to 2% additive; and
 G. 0.1 to 5% filler.

In one embodiment the HFFR TPU/Si-g-EVA compositions of this invention are fabricated into insulation or other sheathing products for wire and cable, or into various parts or components for use in the manufacture of automobiles, building and construction materials, artificial leather, electrical appliances, textiles, furniture and information technology devices. These various products can be fabricated by one or more disparate methods including extrusion, foaming and molding.

The present application comprises the following items:
1. A halogen-free, flame retardant composition comprising in weight percent based on the weight of the composition:
   A. 20 to 60% TPU/Si-g-EVA polymer blend in which the Si-g-EVA is crosslinked,
   B. 1 to 25% organic phosphate ester,
   C. 30 to 60% metal hydrate, and
   D. 0.1 to 10% epoxidized novolac.
2. The composition of item 1 in which the polymer blend comprises 50 to 95 wt % TPU and 5 to 50 wt % Si-g-EVA, based on the weight of TPU/Si-g-EVA polymer blend.
3. The composition of items 1 or 2 in which the Si-g-EVA comprises a vinyl acetate content of 10-70 wt % based on the weight of the EVA copolymer.
4. The composition of any one of the preceding items in which the Si-g-EVA comprises a silane content of 0.5-10 wt % based on the weight of the EVA copolymer.
5. The composition of any one of the preceding items in which the organic phosphate ester is at least one of resorcinol bis(diphenyl phosphate) (RDP) and bisphenol-A bis (diphenyl phosphate) (BPADP) and is present in an amount of 5 to 20 wt %.
6. The composition of any one of the preceding items in which the metal hydrate is at least one of aluminum trihydroxide (ATH) and magnesium hydroxide and is present in an amount of 35 to 55 wt %.
7. The composition of any one of the preceding items further comprising at least one of an anti-dripping agent, an antioxidant, UV-stabilizer, processing aid and filler.
8. The composition of any one of the preceding items in which the TPU is at least one of polyether-based and polyester-based polyurethane and is present in an amount of 60 to 90 wt %, based on the weight of TPU/Si-g-EVA polymer blend.
9. An article comprising the composition of any one of the preceding items.
10. The article of item 9 in the form of a wire or cable covering.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin-based polymer" and like terms means a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

"Ambient conditions" and like terms means a temperature of 23° C. and atmospheric pressure.

"Catalytic amount" means an amount of catalyst necessary to promote the crosslinking of an ethylene-vinylsilane polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

Specific Embodiments

Thermoplastic Polyurethane (TPU)

The thermoplastic polyurethane used in the practice of this invention is the reaction product of a polyisocyanate (typically a di-isocyanate), one or more polymeric diol(s), and optionally one or more difunctional chain extender(s). "Thermoplastic" as here used describes a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One non-limiting example of a structural unit derived from a di-isocyanate (OCN—R—NCO) is represented by formula (I):

in which R is an alkylene, cycloalkylene, or arylene group. Representative examples of these di-isocyanates can be found in U.S. Pat. Nos. 4,385,133, 4,522,975 and 5,167,899 Non-limiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinone bis-(hydroxyethyl)ether; cyclohexylene diols (1,4-, 1,3-, and 1,2-isomers), isopropylidene bis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment the TPU is at least one of polyether-based or polyester-based polyurethane. TPU compositions based on polyether-based polyurethane are preferred. In one embodiment the TPU has a shore A hardness of 70-95 as measured according to ASTM D-1238.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and commercial thermoplastic polyurethanes available from Bayer, Huntsman, the Lubrizol Corporation and Merquinsa.

The TPU typically comprises at least 50, more typically at least 55 and even more typically at least 60, wt % of the TPU/Si-g-EVA polymer blend. The TPU typically comprises not more than 95, more typically not more than 93 and even more typically not more than 90, wt % of the halogen-free TPU composition.

Silane-g-EVA

Ethylene vinyl acetate is a well known polymer and is readily available commercially, e.g., ELVAX® EVA resins available from DuPont. The vinyl acetate content of the EVA resins used in the practice of this invention can range widely, but typically the minimum vinyl acetate content is at least 10, more typically at least 12 and even more typically at least 15, wt %. The maximum vinyl acetate content of the EVA resins used in the practice of this invention can also range widely, but typically it is not greater than 70, more typically not greater than 50 and even more typically not greater than 30, w %.

The EVA copolymer used in the practice of this invention is silane grafted. Any silane that will effectively graft to and crosslink EVA can be used in the practice of this invention, and those described by the following formula are exemplary:

in which $R^1$ is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such silanes are grafted to a suitable ethylene polymer by the use of a suitable quantity of organic peroxide. Additional ingredients such as heat and light stabilizers, pigments, etc., also may be included EVA and silane compound. In any case, the crosslinking reaction typically takes by moisture-induced reaction between the grafted silane groups, the water permeating into the bulk polymer from the atmosphere or from a water bath or "sauna". The phase of the process during which the crosslinks are created is commonly referred to as the "cure phase" and the process itself is commonly referred to as "curing".

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention.

The amount of silane crosslinker used in the practice of this invention can vary widely depending upon the nature of the polymer, the silane, the processing or reactor conditions, the grafting efficiency, the ultimate application, and similar factors, but typically at least 0.5, preferably at least 0.7, wt %, based on the weight of the EVA, is used. Considerations of convenience and economy are two of the principal limitations on the maximum amount of silane crosslinker used in the practice of this invention, and typically the maximum amount of silane crosslinker does not exceed 5, preferably it does not exceed 3, weight percent.

The silane crosslinker is grafted to the polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.04, preferably at least 0.06, parts per hundred resin (phr). Typically, the initiator does not exceed 0.15, preferably it does not exceed about 0.10, phr. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

While any conventional method can be used to graft the silane crosslinker to the polyolefin polymer, one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half life of the initiator.

The Si-g-EVA typically comprises at least 5, more typically at least 10 and even more typically at least 15, wt % of the TPU/Si-g-EVA polymer blend. The Si-g-EVA typically comprises not more than 50, more typically not more than 40 and even more typically not more than 30, wt % of the TPU/Si-g-EVA polymer blend.

TPU/Si-g-EVA Polymer Blend

The TPU/Si-g-EVA polymer blend component of the compositions of this invention comprises two phases, which taken together, form a background matrix for the other components, e.g., phosphate esters, metal hydrates, etc., of the HFFR TPU/Si-g-EVA composition. The blend can be formed in any convenient manner one of which is crosslinking the Si-g-EVA under ambient conditions, e.g., 20 to 30° C. and 40 to 60% relative humidity, in the presence of (i) any of the many catalysts know for promoting the crosslinking of silane-grafted compounds (e.g., SILINK™ DFDA-5488 available from The Dow Chemical Company) and, (ii) the TPU. The components of the blend are simply blended with one another using conventional compounding equipment (e.g., Haake mixer or a twin-screw extruder) and protocols. Water in any form is optional to the crosslinking process.

The TPU/Si-g-EVA polymer blend component of the compositions of this invention can comprise one or more thermoplastic, halogen-free polymers other than TPU and EVA. These other, optional polymers include, but not limited to, polyethylene, polypropylene, ethylene- or propylene copolymer, styrenic block copolymer, and the like. These other polymers can be dispersed in, discontinuous or co-continuous with the TPU, Si-g-EVA or both. If present, then the one or more other polymers are typically present in an amount of 1 to 50, more typically 2 to 30 and even more typically 5 to 20, wt %, based on the combined weight of the polymer blend, i.e., TPU, Si-g-EVA and other polymer(s). If present, these other polymers are typically mixed with the TPU and Si-g-EVA after their polymer blend as been formed.

The TPU/Si-g-EVA polymer blend typically comprises at least 20, more typically at least 30 and even more typically at least 40, wt % of the HFFR TPU/Si-g-EVA composition. The Si-g-EVA typically comprises not more than 60, more typically not more than 55 and even more typically not more than 50, wt % of the HFFR TPU/Si-g-EVA composition.

Organic Phosphate Ester

The organic phosphate esters useful in the practice of this invention include both aromatic and aliphatic phosphate esters and their polymers. Examples of aliphatic phosphate ester flame retardants include trimethyl phosphate, tributyl phosphate, tri(2-ethylhexyl)phosphate, tributoxyethyl phosphate, monoisodecyl phosphate and 2-acryloyloxyethyl acid phosphate. Examples of aromatic phosphate esters include trixylenyl phosphate, tris(phenylphenyl)phosphate, trinaphthyl phosphate, cresyldiphenyl phosphate, xylenyldiphenyl phosphate and dipheny-2-methacryloyloxyethyl phosphate. Examples of aromatic bis(phosphate esters) include resorcinol bis(diphenyl phosphate) (RDP), resorcinol bis(dixylenyl phosphate), resorcinol bis(dicresylphosphate), hydroquinone bis(dixylenyl phosphate), bisphenol-A bis(diphenyl phosphate) (BPADP) and tetrakis(2,6-dimethylphenyl)1,3-phenylene bisphosphate. These phosphate esters can be used alone or in combination with one another. Preferred organic phosphate esters include RDP and BPADP, alone or in combination with one another.

The organic phosphate ester typically comprises at least 1, more typically at least 5 and even more typically at least 10, wt % of the HFFR TPU/Si-g-EVA composition. The organic phosphate ester typically comprises not more than 25, more typically not more than 20 and even more typically not more than 15, wt % of the HFFR TPU/Si-g-EVA composition.

Metal Hydrate

Suitable metal hydrates for use in the practice of this invention include, but are not limited to, aluminum trihydroxide (also known as ATH or aluminum trihydrate) and magnesium hydroxide (also known as magnesium dihydroxide). The metal hydrate may be naturally occurring or synthetic, and they can be used alone or in combination with one another and/or with other inorganic flame retardants, e.g., calcium carbonate, silica, etc., typically in minor amounts.

The metal hydrate typically comprises at least 30, more typically at least 35 and even more typically at least 40, wt % of the HFFR TPU/Si-g-EVA composition. The metal hydrate typically comprises not more than 60, more typically not more than 55 and even more typically not more than 50, wt % of the HFFR TPU/Si-g-EVA composition.

Char Forming Agent

The HFFR TPU/Si-g-EVA composition includes one or more char forming agents to prevent or minimize dripping during combustion. In some embodiments the char forming agent is an epoxidized novolac resin. Epoxidized novolac resins are the reaction product of epichlorohydrin and a phenol novolac polymer in an organic solvent. Nonlimiting examples of suitable organic solvents include acetone, methyl ethyl ketone, methyl amyl ketone, and xylene. The epoxidized novolac resin may be a liquid, a semi-solid, a solid or a combination of two or more of these physical states of matter.

The char forming agent is typically used in an amount ranging from 0.1 to 10 wt % based on the total weight of the composition. This includes embodiments in which the agent is used in an amount ranging from 1 to 3 wt % based on the total weight of the composition, and further includes embodiments in which the agent is used in an amount ranging from 1.5 to 2 wt % based on the total weight of the composition.

Optional Anti-Dripping Agent

In one embodiment the HFFR TPU/Si-g-EVA composition further comprises an anti-dripping agent. Examples include without limitation one or more of triglycidyl isocyanurate and fluoro-based resins such as polytetrafluoroethylene, copolymers of tetrafluoroethylene and hexafluoropropylene, fluorinated carbon resins of tetrafluoroethylene and perfluoroalkylvinylether, polyvinylidenefluoride, and the like.

If present, the anti-dripping agent typically comprises at least 0.01, more typically at least 0.05 and even more typically at least 0.07, wt % of the HFFR TPU/Si-g-EVA composition. If present, the anti-dripping agent typically comprises not more than 2, more typically not more than 1.5 and even more typically not more than 1, wt % of the HFFR TPU/Si-g-EVA composition.

Optional Additives and Fillers

The HFFR TPU/Si-g-EVA composition can, optionally, also contain additives and/or fillers. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. If present, these additives are typically used in a conventional manner and in conventional amounts, e.g., from 0.01 wt % or less to 10 wt % or more, based on the total weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, metabarium borate, zinc borate and meta-zinc borate; metal anhydride such as aluminum anhydride; clay such as diatomite, kaolin and montmorilonite; huntite; celite; asbestos; ground minerals; and lithopone. If present, these fillers are typically used a conventional manner and in conventional amounts, e.g., from 5 wt % or less to 50 wt % or more based on the weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2,2, 6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-bis[butyl(1,2, 2,6,6-pentamethyl-4-piperidinyl)amino]-1,3,5-traizin-2-yl] imino]-3,1-propanediyl]]bis[N'N'''-dibutyl-N'N''-bis(1,2,2,6, 6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis (alpha, alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding/Fabrication

Compounding of the compositions of this invention can be performed by standard means known to those skilled in the art. Examples of compounding equipment are internal batch mixers, such as a Haake, Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

In one embodiment the HFFR TPU/Si-g-EVA composition is prepared by pre-drying TPU pellets at a temperature of 80 to 100° C., preferably 90-95° C. for at least 6 hours under vacuum, preferably for 6 to 10 hours. The dried TPU is then compounded with Si-g-EVA and crosslinking catalyst at a temperature of 160 to 220° C., preferably from 160 to 200° C. Alternatively, and preferably, the dried TPU pellets are compounded with Si-g-EVA and crosslinking catalyst at a temperature under ambient conditions. The polymer blend once prepared, the flame retardants and optional char and anti-dripping agents, additives and fillers are mixed with the blend using conventional compounding equipment and temperatures of 160 to 220° C., preferably from 160 to 200° C.

In some embodiments the additives are added as a pre-mixed masterbatch. Such masterbatches are commonly formed by dispersing the additives, either separately or together, a small amount of the TPU or, if the TPU is used in combination with another resin, e.g., a polyethylene or polypropylene, with a small amount of the other resin. Masterbatches are conveniently formed by melt compounding methods.

Articles of Manufacture

In one embodiment the HFFR TPU/Si-g-EVA composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Other articles of manufacture that can be prepared from the polymer compositions of this invention, particularly under high pressure and/or elevated moisture conditions, include fibers, ribbons, sheets, tapes, pellets, tubes, pipes, weather-stripping, seals, gaskets, foams, footwear and bellows. These articles can be manufactured using known equipment and techniques.

The HFFR TPU/Si-g-EVA compositions of this invention exhibit satisfactory flame resistance performance without using halogenated flame retardants and thus remove environmental and health concerns over combustion of the compositions. The HFFR TPU/Si-g-EVA compositions of this invention also fulfill the heat deformation testing requirements at a temperature as high as 150° C. which is not be achieved by the use of a polymer blend of a TPU and uncrosslinked EVA as the background matrix for flame retardant organic phosphates. The background matrix exhibits better flexibility relative to a polypropylene matrix, and lower density relative to a TPU matrix without EVA. The HFFR TPU/Si-g-EVA compositions of this invention also exhibit smoke density and insulation resistance comparable, if not superior, to an HFFR TPU composition.

The invention is described more fully through the following examples. Unless otherwise noted, all parts and percentages are by weight.

Specific Embodiments

Materials

PELLETHANE™ 2103-90 AE polyester thermoplastic polyurethane (available from Lubrizol; density 1.14 g/cm$^3$ by ASTM D792; MI 7 g/10 min by ASTM D1238). Before use TPU samples are pre-dried at 90° C. for at least 6 hours under vacuum.

ELVAX® 265 ethylene-vinyl-acetate copolymer (vinyl acetate content 28%, density 0.951 g/cm$^3$ by ASTM D792; MI 3 g/10 min by ASTM D1238, available from DuPont). Before using EVA samples are pre-dried at 50° C. for at least 6 hours under vacuum.

Peroxide is 2,5-bis(tert-butylperoxy)-2,5-dimethylhexane (LUPEROX® 101 available from ALDRICH) with a purity of 90% and density of 0.877 g·cm$^3$.

Vinyltrimethoxysilane (VTMS, available from ALDRICH) with a purity of 97% and density of 0.971 g·cm$^{-3}$ is used as received.

SILINK™ AC DFDA-5488 catalyst masterbatch is obtained from the Dow Chemical Company (comprising a sulfonic acid catalyst, a functionalized ethylene polymer and a linear low density polyethylene (LLDPE).

Resorcinol bis(diphenyl phosphate) (RDP) is obtained from Supresta, with grade name FYROLFLEX®RDP.

Epoxidized novolac is selected as solvent free DEN438 with epoxide equivalent weight (EEW) of 176-181 (available from The Dow Chemical Company).

Aluminum trihydrate (ATH) with a low bulk density of 0.2-0.5 g/cm$^3$ is obtained from SHOWA Chemical, Japan.

Grafting of EVA With an Organo-Silane

According to Table 1, liquid VTMS and peroxide admixture are added to dried EVA pellets, and soaking of the liquid component into the pellets is allowed under ambient conditions for 30 minutes with the aid of a twin-roller mixer. Reactive grafting of the obtained polymers is conducted on a lab-scale Haake Mixer (Haake Polylab OS RheoDrive 7, Thermo Scientific) with closed mixing room. Blending time is fixed at 4.5 minutes with a rotating speed of 50 revolutions per minute (rpm). The blending temperature is set at 190° C. The silane-grafted EVA is cut into small pellets for further processing.

TABLE 1

Si-g-EVA Formulations

| Lot | S1 | S2 | S3 | S4 | S5 | S6 | S7 |
|---|---|---|---|---|---|---|---|
| EVA | 95.95 | 97.97 | 97.95 | 95.97 | 95.98 | 95.96 | 95.94 |
| L-101 | 0.05 | 0.03 | 0.05 | 0.03 | 0.02 | 0.04 | 0.06 |
| VTMS | 4 | 2 | 2 | 4 | 4 | 4 | 4 |

Compounding Process

1. Compounding of Si-g-EVA Catalyst Master Batch

According to Table 2, TPU and Si-g-EVA are loaded into the Haake Mixer together under a shear speed of 60 rpm and at a temperature of 180° C. After 2-3 minutes AC catalyst master batch is added and compounded for additional 5 minutes. The resulting polymer blend is pressed into plaques and cut into small pieces (1 cm by 1 cm). The sample pieces are then put into an ASTM room with a set temperature of 23±1° C. and a relative humidity of 50±5% for curing.

TABLE 2

TPU/Crosslinked EVA Polymer Blends

| Lot | S8 | S9 | S10 | S11 | S12 | S13 | S14 | S15 | S16 | S17 |
|---|---|---|---|---|---|---|---|---|---|---|
| Sample 1 | 15 | 25 | 35 | 19.9 | 19.7 | 19.3 | | | | |
| Sample 2 | | | | | | | 15 | | 19 | |
| Sample 3 | | | | | | | | 19 | | |
| Sample 4 | | | | | | | | | | 19 |
| TPU | 80 | 70 | 60 | 80 | 80 | 80 | 80 | 80 | 80 | 80 |
| DFDA-5488 | 5 | 5 | 5 | 0.1 | 0.3 | 0.7 | 5 | 1 | 1 | 1 |

2. Compounding of HFFR TPU/Si-g-EVA Compositions
Inventive Samples 11-17

The cured polymer samples 11-17 obtained from step 1 are optionally dried at 90° C. under vacuum for 6 hours, then compounded with flame retardant (FR) chemicals on the Haake Mixer. The cured polymer samples from step 1 are loaded into the mixing room at a shear speed of 60 rpm and temperature of 180° C. for plasticization. After 2 minutes, an admixture of ATH, RDP and epoxidized novolac are added within 2 minutes and compounded for additional 6 minutes.

Comparative Samples 5-7

TPU, EVA or Sie-g-EVA samples 5-7 are loaded into the Haake Mixer together under a shear speed of 60 rpm and at a temperature of 180° C. After 2-3 minutes, an admixture of ATH, RDP and epoxidized novolac are added within 2 minutes and compounded for additional 6 minutes.

Testing

Polymer compounds made in step-1 (samples 8-10) and Step-2 compounding shown above are pressed into plaques by using a compression molder at 180-185° C. The plaques with a thickness of about 1.5 mm are then subjected to a cold-presser under the same pressure and at room temperature for 5 minutes. Samples are then used for the following tests.

1. Heat Deformation

Heat deformation testing is conducted according to UL 1581-2001. For each formulation, two or three parallel sample plaques are placed into an oven and preheated at 150° C. for one hour. The preheated samples are then pressed with same loading at 150° C. for one hour. After that the pressed samples without removal of weights are placed in an ASTM room with setting temperature at 23° C. for additional one hour. The change of the thickness of the sample plaques are recorded and heat deformation ratio is calculated according to HD %=$(D_0-D_1)/D_0$*100%, wherein $D_0$ represents the original sample thickness and $D_1$ represents the sample thickness after the deformation process. Calculated deformation ratios for the two parallel samples are averaged.

2. Tensile Testing

Tensile tests are conducted on an INSTRON® 5565 tensile tester. Plaques are cut into bell-shape specimens using die cutter. Tensile tests are carried out according to ASTM D638 at room temperature. The speed is 50 mm/min.

3. Morphology Investigation by Atomic Force Microscopy (AFM)

Samples are firstly microtomed using a diamond knife at −120° C. on a LEICA™ UC6 microtome equipped with an FC6 cryo-sectioning chamber, and then images are obtained on a nanoscope V (S/N NS5-226) using a Dimension 3100 Large Sample AFM (Veeco, Inc., Santa Barbara, Calif. S/N: 366#.)

4. FR Performance

Mimic VW-1 FR test is conducted in an UL94 chamber. Test specimen is limited to the dimension of 200 mm by 2.7 mm by 1.9 mm. The specimen is hanged on the clamp, with longitudinal axis vertical by applying 50 g load on the below end. One paper flag (2 cm by 0.5 cm) is applied on the top of the wire. The distance of flame bottom (highest point of the burner oracle) to the bottom of flag is 18 cm. Flame is applied continuously for 45 seconds. After flame time (AFT), uncharred wire length (UCL) and uncharred flag area percentage (flag uncharred) are recorded during and after combustion. Four or 5 specimens are tested for each sample. Any of the following phenomenon happened will be scored as "not pass":

1. Cotton under the specimen was ignited;
2. Flag was burned out;
3. Dripping with flame.

Test Results

Polymer blends comprising TPU, silane-g-EVA and SIL-INK® ambient cure catalyst master batch DFDA-5488 are prepared according to the formulations shown in Table 3. The samples are cured under ambient conditions for 24 hours before the testing. For all the three samples, heat deformation at 150° C. is lower than 25%. Tensile stress is higher than 20 MPa and tensile elongation is higher than 550%. Typically the specifications for personal electronic wire and cable applications require tensile stress higher than 8.3 MPa and elongation larger than 150%. In some key applications a heat deformation ratio at 150° C. of less than 50% is required. The inventive TPU/crosslinked EVA blends show very positive results regarding all the requirements.

Figure 1A:
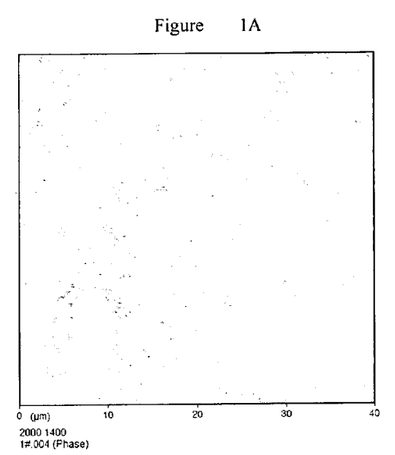
FIGS. 1A-1F are atomic force microscopy images of Samples 8-10 TPU and crosslinked Si-g-EVA blends.
Figure 1B:
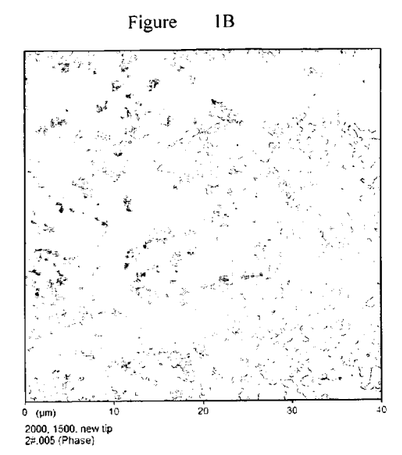
Figure 1C:
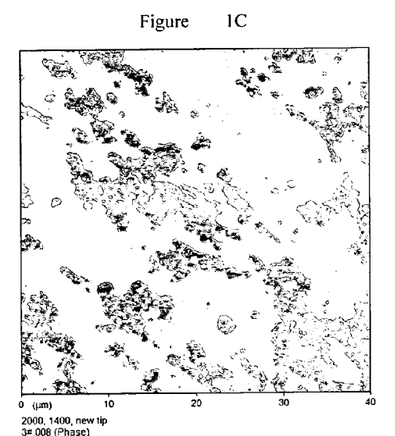
Figure 1D:
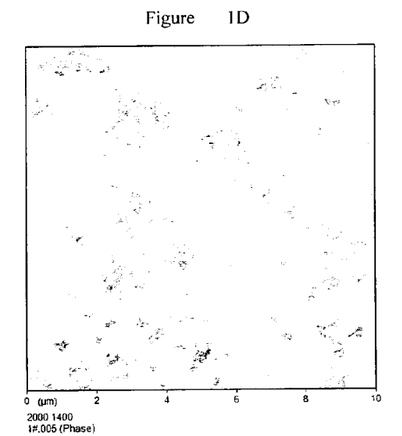
Figure 1E:
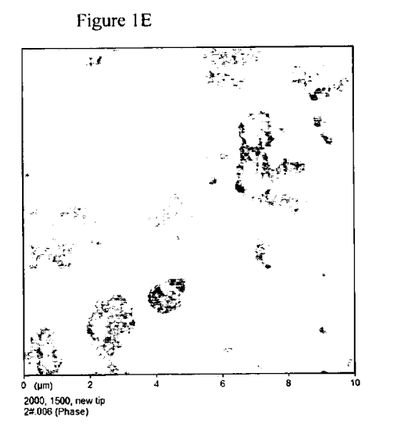
Figure 1F:
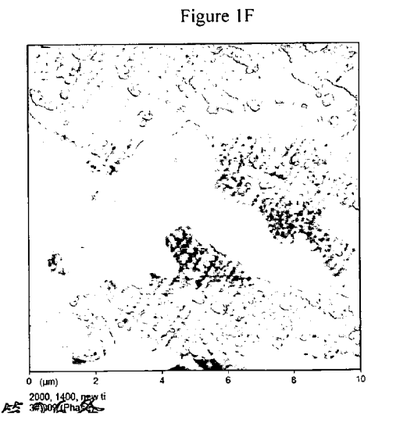

The morphology of the inventive polymer blends is shown in FIGS. 1A-1F. The polymer blend of Example 8 is shown in FIGS. 1A and 1D, the polymer blend of Example 9 is shown in FIGS. 1B and 1E, and the polymer blend of Example 10 is shown in FIGS. 1C and 1F. FIGS. 1D-1F are FIGS. 1A-1C, respectively, except at a greater magnification. The light color shows TPU phase while the dark color shows crosslinked EVA phase. TPU is illustrated as the continuous matrix with dispersed EVA domain in all the cases. Crosslinked EVA shows a good compatibility with TPU matrix and distributed homogeneously in the TPU matrix. For inventive samples 8 and 9 the domain size of crosslinked EVA is found to be lower than 5 microns (μm) generally.

TABLE 3

Tensile and Heat Deformation Test Results

| Lot | Sample 8 | Sample 9 | Sample 10 |
| --- | --- | --- | --- |
| TPU/wt % | 80 | 70 | 60 |
| Si-g-EVA/wt % | 15 | 25 | 35 |
| Catalyst/wt % | 5 | 5 | 5 |
| Heat deformation at 150° C./% | 20 | 22 | 24 |
| Standard deviation/% | 4 | 3 | 1 |
| Tensile stress/MPa | 31 | 26 | 22 |
| Standard deviation/MPa | 1.1 | 1.4 | 1.5 |
| Tensile elongation/% | 561 | 565 | 564 |
| Standard deviation/% | 28 | 23 | 35 |

The standard deviation indicates the standard deviation of testing results for tensile stress and elongation.

Preparation of FR Composition js

The TPU/crosslinked Si-g-EVA blends are further utilized to formulate FR compositions with ATH, RDP and epoxidized novolac (reported in Table 4). With different loadings of vinyltrimethoxysilane (VTMS), peroxide and DFDA-5488, the crosslinking level of the dispersed Si-g-EVA varies. Comparative example 1 (shown in Table 5) is TPU/EVA blend. Comparative examples 2-4 are TPU/Si-g-EVA blends. All the comparative examples did not have the ambient cure catalyst and as such, the EVA component is not substantially crosslinked. The loading of EVA (or Si-g-EVA or crosslinked Si-g-EVA) in the inventive examples and comparative examples are in the same range of 8-9 wt % by the weight of FR composition.

In general the improvement of heat deformation performance is significant when substantial crosslinking is introduced as shown by the inventive examples. For all the inventive examples heat deformation is generally lower than 30% as compared to 100% of heat deformation in the comparative examples. Furthermore, flame retardant performance for all the inventive examples are excellent and pass stringent VW-1 testing. Tensile stress is around 7 MPa for most inventive examples and elongation is larger than 150%. All the examples are prepared by a lab-scale Haake blending process. Generally, the tensile properties of the inventive samples would be improved by twin-screw extrusion. In summary, the inventive FR compositions afford superior heat deformation performance, excellent FR performance and tensile stress around 7 MPa and elongation larger than 150%.

TABLE 4

Material Properties of HFFR TPU/Si-g-EVA Compositions

| Lot | Inventive Example 1 | Inventive Example 2 | Inventive Example 3 | Inventive Example 4 | Inventive Example 5 | Inventive Example 6 | Inventive Example 7 |
|---|---|---|---|---|---|---|---|
| Sample 11 | 43 | | | | | | |
| Sample 12 | | 43 | | | | | |
| Sample 13 | | | 43 | | | | |
| Sample 14 | | | | 43 | | | |
| Sample 15 | | | | | 43 | | |
| Sample 16 | | | | | | 43 | |
| Sample 17 | | | | | | | |
| ATH/wt % | 40 | 40 | 40 | 40 | 40 | 40 | 40 |
| RDP/wt % | 15 | 15 | 15 | 15 | 15 | 15 | 15 |
| Epoxidized novolac/wt % | 2 | 2 | 2 | 2 | 2 | 2 | 2 |
| Heat deformation at 150° C./% | 24 | 22 | 26 | 21 | 31 | 29 | 20 |
| Tensile stress/MPa | 7.0 | 7.2 | 7.2 | 6.3 | 7.0 | 7.0 | 6.6 |
| Stdv./MPa | 0.1 | 0.2 | 0.3 | 0.2 | 0.1 | 0.2 | 0.2 |
| Tensile elongation/% | 176 | 148 | 155 | 149 | 180 | 155 | 146 |
| Stdv./MPa | 16 | 20 | 18 | 23 | 12 | 15 | 30 |
| Mimic VW-1 testing (Pass/Total) | 4/5 | 4/5 | 3/5 | 5/5 | 3/5 | 4/5 | 4/5 |

TABLE 5

Compositions of TPU/EVA Blends and TPU/Si-g-EVA Blends

| | Comparative Example 1 | Comparative Example 2 | Comparative Example 3 | Comparative Example 4 |
|---|---|---|---|---|
| TPU/wt % | 34.4 | 34.4 | 34.4 | 34.4 |
| EVA/wt % | 8.6 | | | |
| Sample 5/wt % | | 8.6 | | |
| Sample 6/wt % | | | 8.6 | |
| Sample 7/wt % | | | | 8.6 |
| ATH/wt % | 40 | 40 | 40 | 40 |
| RDP/wt % | 15 | 15 | 15 | 15 |
| Epoxidized novolac/wt % | 2 | 2 | 2 | 2 |
| Heat deformation at 150° C./% | 100 | 100 | 100 | 100 |
| Tensile stress/MPa | 11.3 | 7.2 | 8.7 | 8.3 |
| Std/MPa | 0.3 | 0.2 | 0.3 | 0.2 |
| Tensile elongation/% | 348 | 183 | 267 | 290 |
| Std/% | 12 | 7 | 26 | 18 |
| Mimic VW-1 testing (Pass/Total) | 5/5 | 4/5 | 4/5 | 4/5 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A halogen-free, flame retardant composition comprising in weight percent based on the weight of the composition:

A. 20 to 60% of a thermoplastic polyurethane/silane-grafted ethylene vinyl acetate (TPU/Si-g-EVA) polymer blend in which the Si-g-EVA is crosslinked and has a VA content of no greater than 30 wt %, wherein the thermoplastic polyurethane and silane-grafted ethylene vinyl acetate are phase separated, B. 1 to 25% of an organic phosphate ester, C. 30 to 60% of a metal hydrate, and D. 0.1 to 10% of an epoxidized novolac.

2. The composition of claim 1 in which the TPU/Si-g-EVA polymer blend comprises 50 to 95 wt % of the TPU and 5 to 50 wt % of the Si-g-EVA, based on the weight of the TPU/Si-g-EVA polymer blend.

3. The composition of claim 2 in which the Si-g-EVA comprises a vinyl acetate content of 10-30 wt % based on the weight of the ethylene vinyl acetate (EVA) copolymer.

4. The composition of claim 3 in which the Si-g-EVA comprises a silane content of 0.5-10 wt % based on the weight of the EVA copolymer.

5. The composition of claim 4 in which the organic phosphate ester is at least one of resorcinol bi(diphenyl phosphate) (RDP) and bisphenol-A bis(diphenyl phosphate) (BPADP) and is present in an amount of 5 to 20 wt %.

6. The composition of claim 5 in which the metal hydrate is at least one of aluminum trihydroxide (ATH) and magnesium hydroxide and is present in an amount of 35 to 55 wt %.

7. The composition of claim 6 further comprising at least one of an anti-dripping agent, an antioxidant, UV-stabilizer, processing aid and filler.

8. The composition of claim 7 in which the TPU is at least one of polyether-based and polyester-based polyurethane and is present in an amount of 60 to 90 wt %, based on the weight of TPU/Si-g-EVA polymer blend.

9. An article comprising the composition of claim 1.

10. The article of claim 9 in the form of a wire or cable covering.

* * * * *